(12) United States Patent
Tsai (10) Patent No.: US 9,717,328 B1
(45) Date of Patent: Aug. 1, 2017

(54) DESKTOP DEVICE FOR LIFTING AND LOWERING KEYBOARD AND MONITOR

(71) Applicant: Hsuan-Chin Tsai, Chai-Yi Hsien (TW)

(72) Inventor: Hsuan-Chin Tsai, Chai-Yi Hsien (TW)

( * ) Notice: Subject to any disclaimer, the term of this patent is extended or adjusted under 35 U.S.C. 154(b) by 0 days.

(21) Appl. No.: 15/364,300

(22) Filed: Nov. 30, 2016

(51) Int. Cl.
*A47B 37/00* (2006.01)
*A47B 21/02* (2006.01)
*A47B 21/04* (2006.01)
*F16M 11/18* (2006.01)
*A47B 9/10* (2006.01)

(52) U.S. Cl.
CPC .............. *A47B 21/02* (2013.01); *A47B 9/10* (2013.01); *A47B 21/04* (2013.01); *F16M 11/18* (2013.01)

(58) Field of Classification Search
CPC ......... F16M 11/18; A47B 21/00; A47B 21/02; A47B 21/04; A47B 21/0314; A47B 2021/0321; A47B 2021/0364
USPC .......... 108/50.01, 50.02, 50.11, 147, 147.11; 248/918, 920, 917
See application file for complete search history.

(56) References Cited

U.S. PATENT DOCUMENTS

| | | | |
|---|---|---|---|
| 6,056,251 A * | 5/2000 | Knopp | A47C 3/30 108/144.11 |
| 6,092,474 A * | 7/2000 | Chen | A47B 9/10 108/147 |
| 6,397,761 B1 * | 6/2002 | Moore | A47B 9/10 108/147 |
| 6,571,720 B2 * | 6/2003 | Moore | A47B 19/06 108/147 |
| 6,712,008 B1 * | 3/2004 | Habenicht | A47B 21/0314 108/147 |
| 6,783,105 B2 * | 8/2004 | Oddsen, Jr. | F16M 11/10 248/279.1 |
| 7,178,469 B2 * | 2/2007 | Goza | A47B 21/0314 108/50.01 |
| 7,311,048 B2 * | 12/2007 | Kopala, Jr. | A47B 9/00 108/147 |
| 7,677,518 B2 * | 3/2010 | Chouinard | A47B 21/02 108/10 |
| 7,997,211 B2 * | 8/2011 | Peterson | F16M 11/10 108/152 |

(Continued)

*Primary Examiner* — Jose V Chen
(74) *Attorney, Agent, or Firm* — Alan D. Kamrath; Kamrath IP Lawfirm, P.A.

(57) ABSTRACT

A desktop device for lifting and lowering a keyboard and monitor includes: a vertically-movable stand-unit fixed to a bottom-base and having a securing outer-pipe and a vertically-movable inner-pipe penetratingly fitted therein; a monitor-holder and a keyboard-supporting plate both disposed at the vertically-movable inner-pipe; a control unit having a slide control-key and mounted on the keyboard-supporting plate; and a pneumatic rod with an extensible rod having one end. A gas-releasing pin is disposed at the end of the extensible rod, and the pneumatic rod received in the vertically-movable inner-pipe. The top of the pneumatic rod is pivotally fixed to the top of the vertically-movable inner-pipe, allowing another end of the pneumatic rod to connect with a connector pivotally fixed to the bottom-base. A slide control-key is disposed at the keyboard-supporting plate and connected to a control-cable which is pulled and released to press on and release the gas-releasing pin.

3 Claims, 12 Drawing Sheets

(56) References Cited

U.S. PATENT DOCUMENTS

| | | | | |
|---|---|---|---|---|
| 8,081,431 B2* | 12/2011 | Fan | .................. | F16M 11/046 |
| | | | | 248/917 |
| 8,191,487 B2* | 6/2012 | Theesfeld | .............. | A47B 57/06 |
| | | | | 108/106 |
| 9,080,721 B2* | 7/2015 | Hazzard | ................. | A47B 21/02 |
| 9,279,537 B2* | 3/2016 | Hung | .................. | F16M 11/18 |
| 2007/0145203 A1* | 6/2007 | Takada | ................. | F16M 11/10 |
| | | | | 248/162.1 |
| 2008/0232059 A1* | 9/2008 | Allen | ................ | E05B 73/0082 |
| | | | | 361/679.03 |
| 2012/0187056 A1* | 7/2012 | Hazzard | ................ | A47B 21/02 |
| | | | | 211/26 |
| 2012/0187256 A1* | 7/2012 | Ergun | .................. | A47B 9/12 |
| | | | | 248/123.11 |
| 2014/0137773 A1* | 5/2014 | Mandel | ................ | G06Q 10/109 |
| | | | | 108/50.11 |
| 2016/0037907 A1* | 2/2016 | Ergun | .................. | A47B 9/12 |
| | | | | 108/147 |

* cited by examiner

DESKTOP DEVICE FOR LIFTING AND LOWERING KEYBOARD AND MONITOR

FIELD OF THE INVENTION

The present invention relates to a device placed on the top of a desk and adapted to mount a keyboard and monitor and, more particularly, to a desktop device for adjusting the operating height of a keyboard and monitor properly to meet a user's need to work while sitting or standing.

BACKGROUND OF THE INVENTION

Apparatuses, such as personal computers, keyboards, and monitors, are indispensable to sophisticated workplaces nowadays. The workers (hereinafter referred to as "users") always expect that each of the apparatuses enables them to carry out operations with different postures. For example, the users may want to carry out some operations while sitting and other operations while standing. Furthermore, the users may want to carry out both the sitting-based operations and standing-based operations at the same workstation. To this end, it is necessary to adjust the operating heights of monitors, keyboards and/or mouses provided at the workstation in order to meet the user's needs.

Conventional techniques of adjusting the operating heights of monitors have proved feasible for a long time and are presently in wide use. In view of the fact that users come in different body sizes and need to alternate between a sitting posture and a standing posture in order to work, the heights of the tops of desks provided at a workstation to place computers, monitors, keyboards, and mouses can be easily adjusted with an electrically driven mechanism or an effortless mechanical mechanism. However, when conventional desks are in use, the desktop heights cannot be adjusted, nor can the users alternate between a sitting posture and a standing posture while operating the apparatuses.

SUMMARY OF THE INVENTION

In view of the aforesaid drawbacks of the prior art, that is, conventional desks are incapable of or ineffective in enabling users to alternate between a sitting posture and a standing posture while operating computer-related apparatuses, the present invention provides a desktop device for lifting and lowering a keyboard and monitor. The device comprises an extensible vertically-movable stand unit on which a monitor holder and a keyboard supporting plate are disposed. A monitor and a keyboard or a mouse are mounted on the monitor holder and the keyboard supporting plate, respectively. The monitor, keyboard, and mouse are connected to a control stick, which is disposed at a gas-releasing pin of a pneumatic rod disposed in the vertically-movable stand unit to control its vertical movement, by a control cable through a slide control key mounted on the keyboard supporting plate. The gas-releasing pin of the pneumatic rod is pressed against or released. Hence, the operating heights of the monitor, keyboard, and mouse mounted on the vertically-movable stand unit can be easily, appropriately adjusted to meet users' need to alternate between a sitting posture and a standing posture while operating apparatuses.

To solve related technical problems, the present invention proposes a technical solution described below. A vertically-movable stand unit comprising a securing outer pipe and a vertically-movable inner pipe penetratingly fitted inside the securing outer pipe is erected on a bottom base. Both a monitor holder and a keyboard supporting plate are disposed at the vertically-movable inner pipe. A control unit equipped with a slide control key is mounted on a lateral side of the keyboard supporting plate to control vertical movement of the vertically-movable inner pipe. A pneumatic rod is disposed in the vertically-movable inner pipe and pivotally fixed to the upper end of the vertically-movable inner pipe. The pneumatic rod has an extensible end which extends downward and has a gas-releasing pin. A connector is connected to the terminal end of the extensible end of the pneumatic rod and pivotally fixed to the bottom base. An admitting hole is radially, centrally disposed at the connector. A control stick is penetratingly disposed in the admitting hole and abuts against the gas-releasing pin so that the control stick can swing. A control cable, which can be pulled by the slide control key, is connected to the tip of a swing end of the control stick. When pulled and released by the slide control key, the control cable causes the control stick to swing. When the gas-releasing pin is pressed against or released, the pneumatic rod extends and retracts to drive the vertical movement and positioning of the vertically-movable inner pipe.

Regarding the technical solution, two connecting bases pivotally fixed together are disposed between the lower end of the vertically-movable inner pipe and the keyboard supporting plate. A positioning hole is disposed on the lateral side of the connecting bases and corresponds in position to the point of pivotal fixing. A positioning screw is penetratingly disposed on the lateral side of the pivotal fixing portion disposed at the outer end of the point of pivotal fixing so that the positioning screw can penetrate the positioning hole.

Regarding the technical solution, a front of the securing outer pipe has an opening whose two sides form two opposing inner grooves, respectively, with a protruding guide portion protrudingly disposed on a back of the securing outer pipe and opposite the opening, and a front of the vertically-movable inner pipe has an opening whose two sides form two guide slide portions slidingly disposed in the two inner grooves on the front of the securing outer pipe, respectively, with a substantially C-shaped opening slot disposed on the back of the vertically-movable inner pipe such that two guide wheels are disposed on two inner sides of the opening slot to abut against two lateral sides of the protruding guide portion of the securing outer pipe, respectively.

The benefits achieved with the present invention are described below. To operate the monitor and keyboard while standing, the user holds the keyboard supporting plate by hand, uses his/her fingers to push the slide control key and thereby pull a control cable to drive the control stick to press on the gas-releasing pin of the pneumatic rod, thereby allowing the pneumatic rod to extend and retract and thus drive the monitor and keyboard, and effectuating the adjustment of height and positioning easily. Therefore, the device enables the user sitting on a conventional desk at the workplace to alternate between a sitting posture and a standing posture.

DETAILED DESCRIPTION OF THE INVENTION

Figure 1:
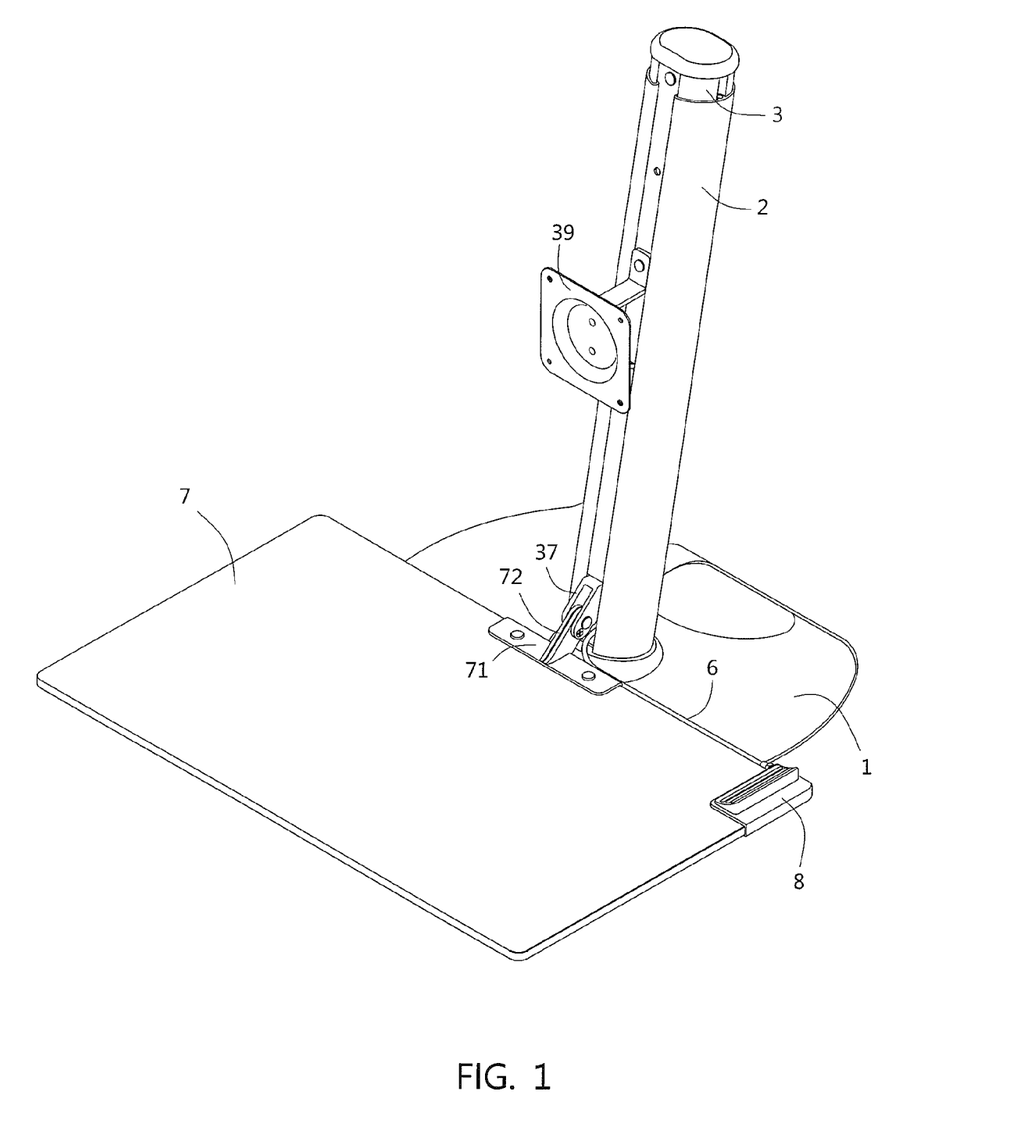
FIG. 1 is a perspective view of a desktop device for lifting and lowering a keyboard and monitor according to the present invention.
Figure 2:
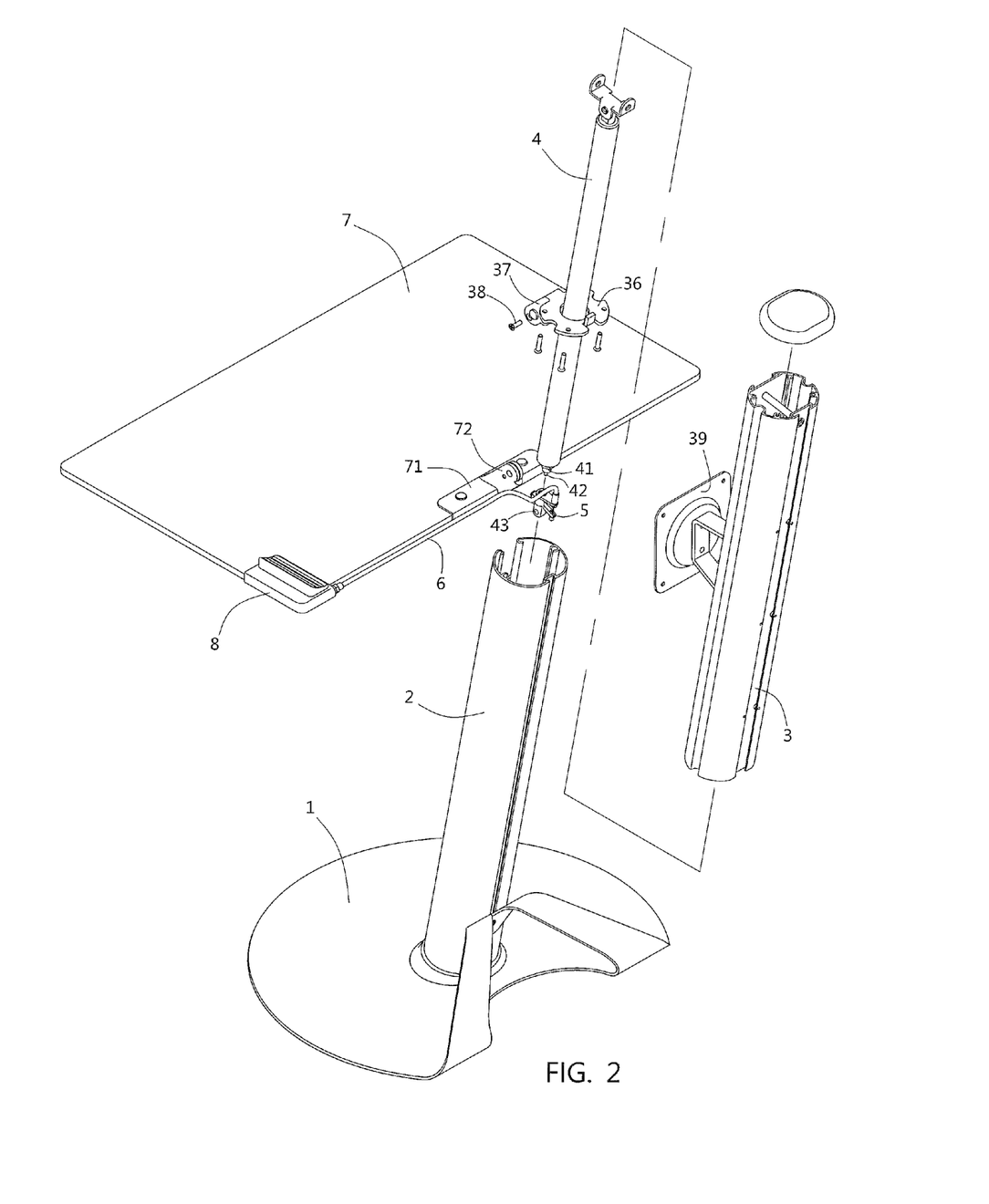
FIG. 2 is a rear exploded view of the device according to the present invention.
Figure 3:
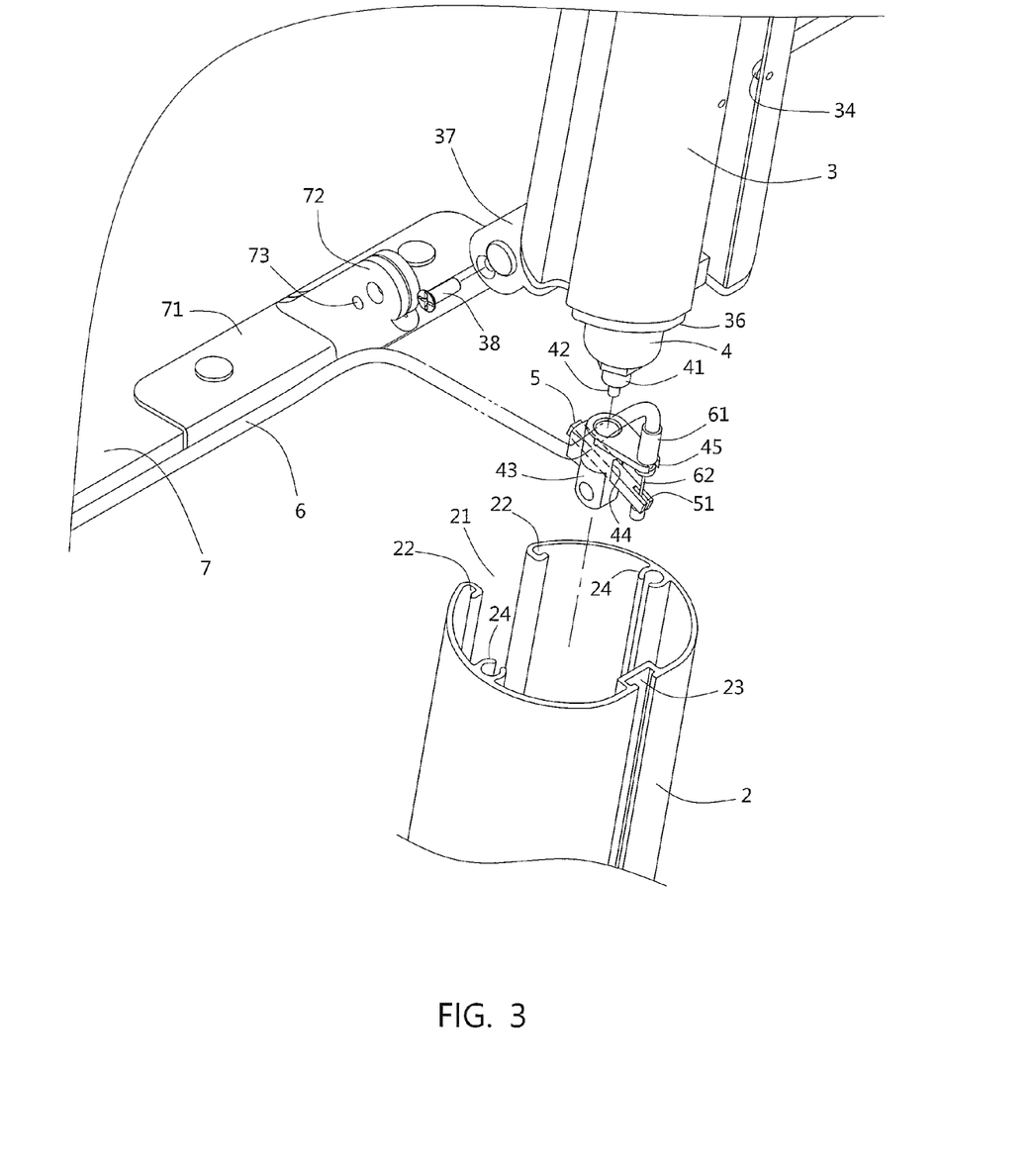
FIG. 3 is an exploded view of separation of a keyboard supporting plate, a vertically-movable inner pipe, and a securing outer pipe according to the present invention.

Referring to FIG. 1 through FIG. 3, the present invention provides a desktop device for mounting thereon a monitor and keyboard or mouse. The device comprises a bottom base 1, a securing outer pipe 2 erected on and fixed to the bottom base 1, and a vertically-movable inner pipe 3 insertedly disposed in the securing outer pipe 2. The vertically-movable inner pipe 3 is slidable upward and downward within the securing outer pipe 2. The front of the securing outer pipe 2 has an opening 21. The two sides of the opening 21 form two opposing inner grooves 22, respectively. A protruding guide portion 23 is protrudingly disposed on the back of the securing outer pipe 2 and opposite the opening 21. The protruding guide portion 23 protrudes toward the hollow core of the securing outer pipe 2. Round groove portions 24 are disposed on two lateral sides of the securing outer pipe 2 to mesh with screws, respectively. The round groove portions 24 protrude toward the hollow core of the securing outer pipe 2. The screws penetrate the bottom base 1 from below and mesh with the round groove portions 24 to thereby fasten the securing outer pipe 2 to the bottom base 1.

Figure 4:
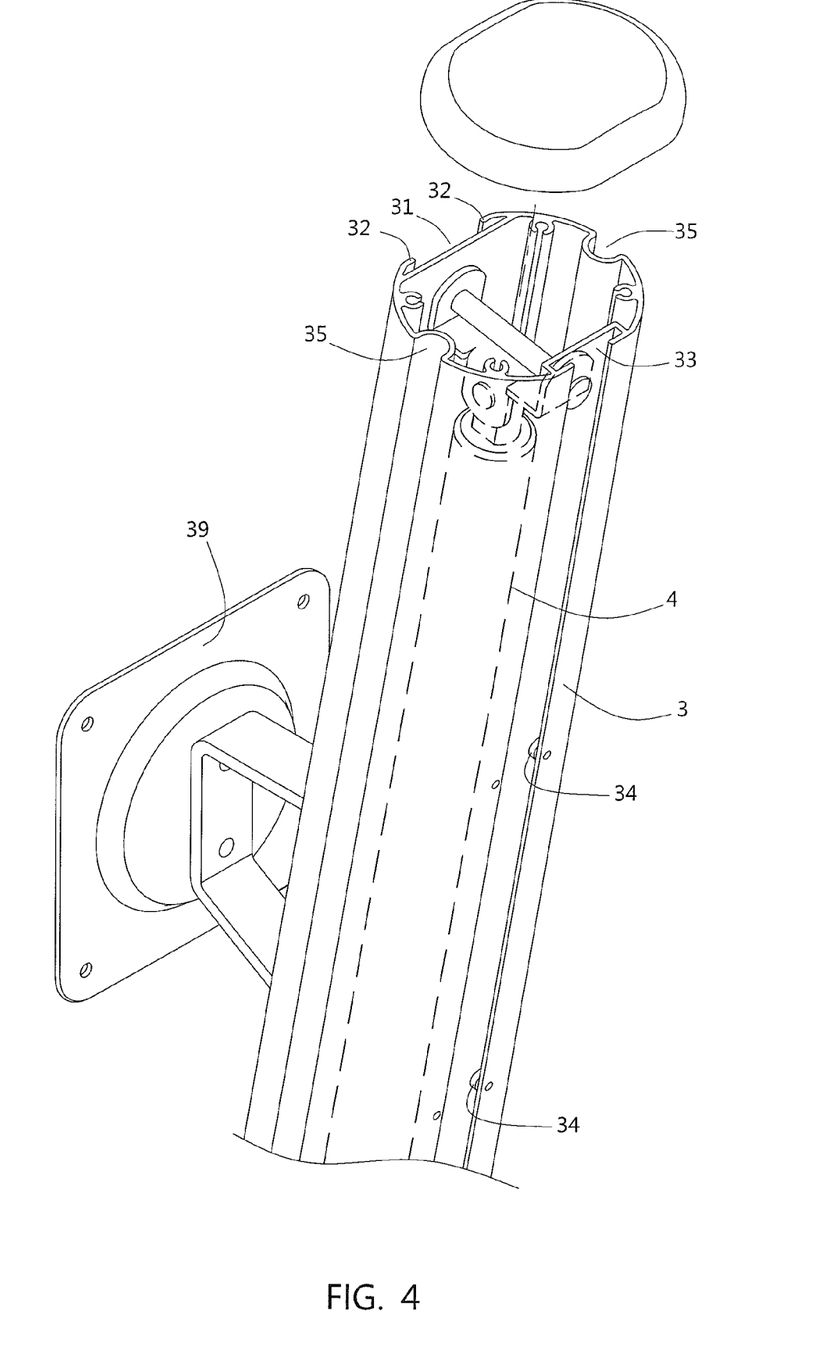
FIG. 4 is a schematic view of coupling a pneumatic rod and the vertically-movable inner pipe together according to the present invention.
Figure 5:
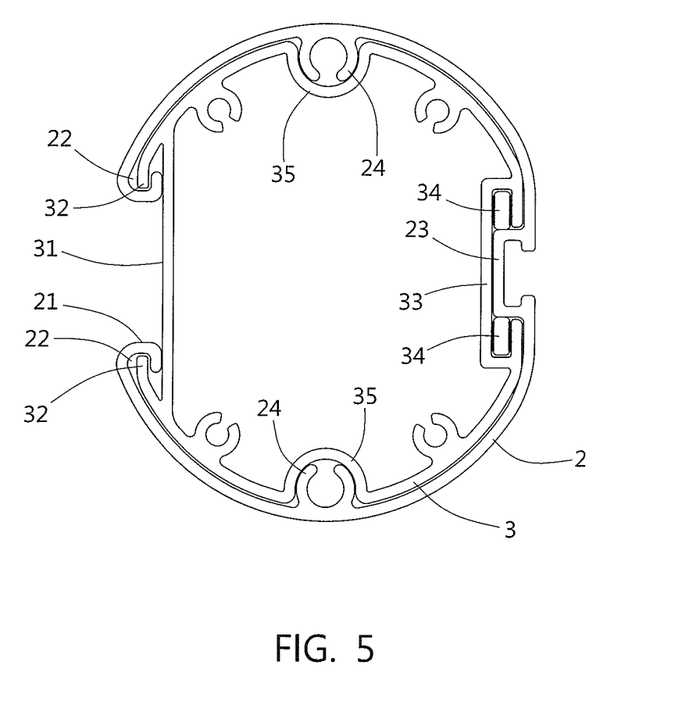
FIG. 5 is a schematic view of engagement between the securing outer pipe and the vertically-movable inner pipe according to the present invention.
Figure 6:
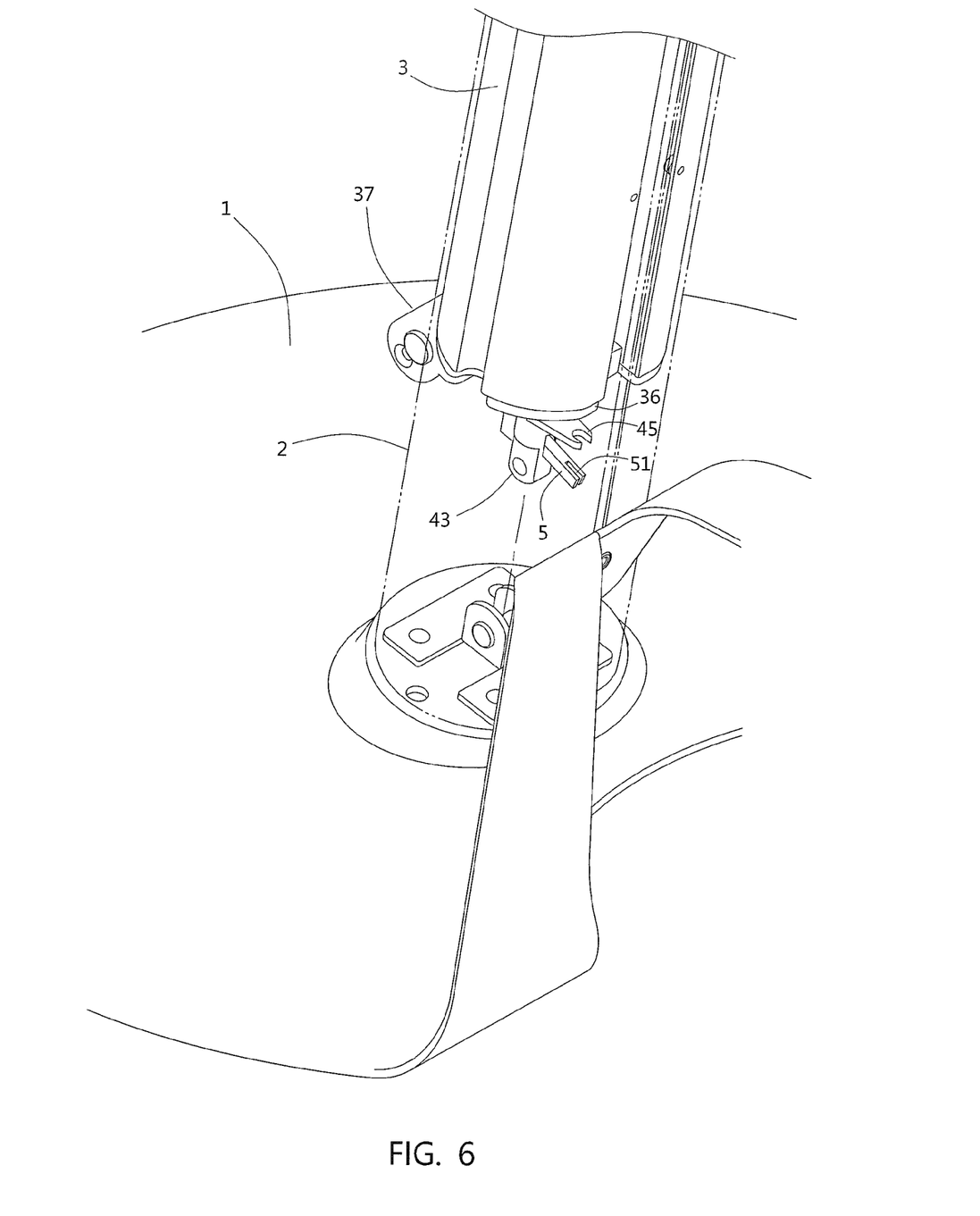
FIG. 6 is a schematic view of coupling the pneumatic rod and a bottom base together according to the present invention.

Referring to FIG. 4 and FIG. 5, the front of the vertically-movable inner pipe 3 has an opening 31. The two sides of the opening 31 form two guide slide portions 32 slidingly disposed in the two opposing inner grooves 22 on the front of the securing outer pipe 2, respectively. A substantially C-shaped opening slot 33 is disposed on the back of the vertically-movable inner pipe 3 and opposite the opening 31. Two guide wheels 34 are disposed on two inner sides of the opening slot 33 to abut against two lateral sides of the protruding guide portion 23 of the securing outer pipe 2, respectively. Two guide groove portions 35 are disposed on two lateral sides of the vertically-movable inner pipe 3. The round groove portions 24 disposed on the two lateral sides of the securing outer pipe 2 slide along the two guide groove portions 35, respectively. Hence, the vertically-movable inner pipe 3 moves vertically within the securing outer pipe 2 smoothly and steadily. A monitor holder 39 is fixed to the opening of the vertically-movable inner pipe 3 and corresponds in position to an upper part of the vertically-movable inner pipe 3.

Referring to FIG. 2 through FIG. 4, and FIG. 6, a pneumatic rod 4 is received in the vertically-movable inner pipe 3. The pneumatic rod 4 has an extensible rod 41 which is not only extensible and retractable but can also be positioned in place. A gas-releasing pin 42 is disposed at a terminal end of the extensible rod 41. The upper end of the pneumatic rod 4 is pivotally fixed to the vicinity of the upper end of the vertically-movable inner pipe 3. A connector 43 is connected to the terminal end of the extensible rod 41 and pivotally fixed to the bottom base 1. An admitting hole 44 is radially, centrally disposed at the connector 43. The gas-releasing pin 42 disposed at the terminal end of the extensible rod 41 is inserted into the admitting hole 44 to reach the upper part thereof. A control stick 5 is insertedly disposed in the admitting hole 44 and can swing up and down to abut against the gas-releasing pin 42. A cord-hooking slot 51 is disposed at the terminal end of the swing end of the control stick 5. The connector 43 extends to form an abutting portion 45 positioned above the swing end of the control stick 5. A sleeve portion 61 equipped with a control cable 6 abuts against the abutting portion 45. A cord 62 penetratingly disposed at the sleeve portion 61 is engaged with and fastened to the cord-hooking slot 51 at the swing end of the control stick 5.

Referring to FIG. 3, a connecting base 36 with a pivotal fixing portion 37 which extends forward is fixed to the lower end of the vertically-movable inner pipe 3. A keyboard supporting plate 7 is provided. A connecting base 71 is centrally fixed to the rear edge of the keyboard supporting plate 7. The connecting base 71 has a pivotal fixing portion 72 which extends backward. Pivotal fixing portions 37, 72 of two connecting bases 36, 71 are pivotally fixed together. A positioning screw 38 is penetratingly disposed on the lateral side of the pivotal fixing portion 37 disposed at the outer end of the point of pivotal fixing. A positioning hole 73 is disposed at a related point on the pivotal fixing portion 72 so that the positioning screw 38 can penetrate the positioning hole 73. Hence, the keyboard supporting plate 7 bends downward horizontally before being positioned and fixed in place.

Figure 7:
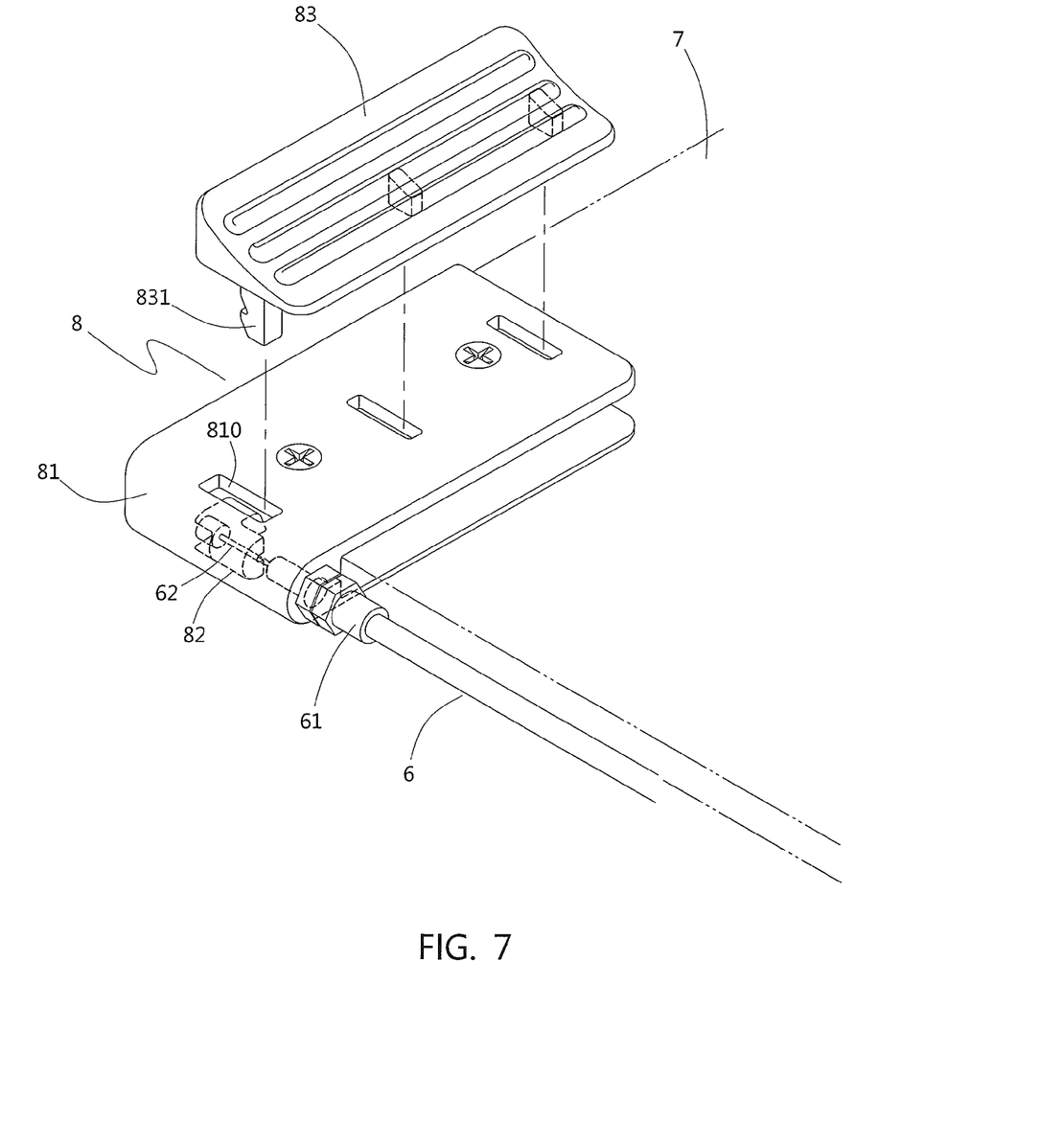
FIG. 7 is an exploded view of a control unit according to the present invention.
Figure 8:
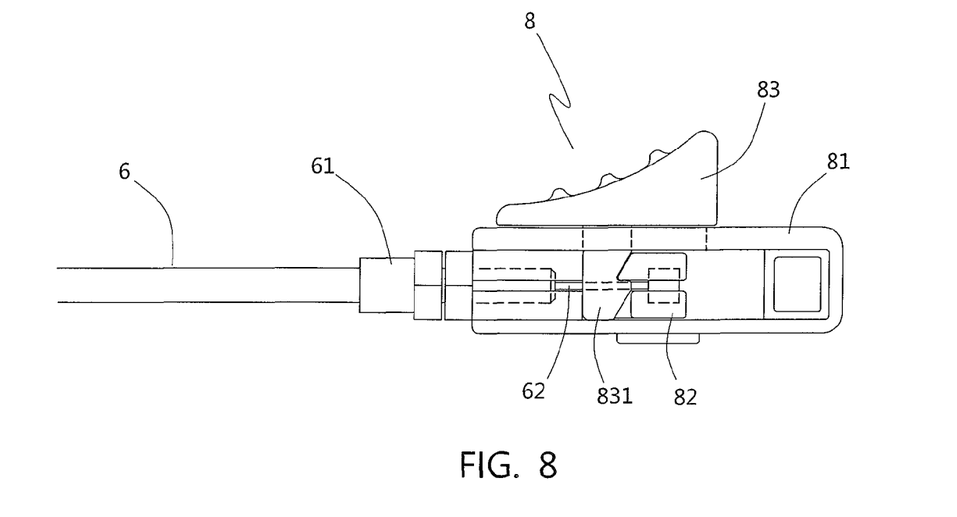
FIG. 8 is a schematic view of the control unit before operation according to the present invention.
Figure 9:
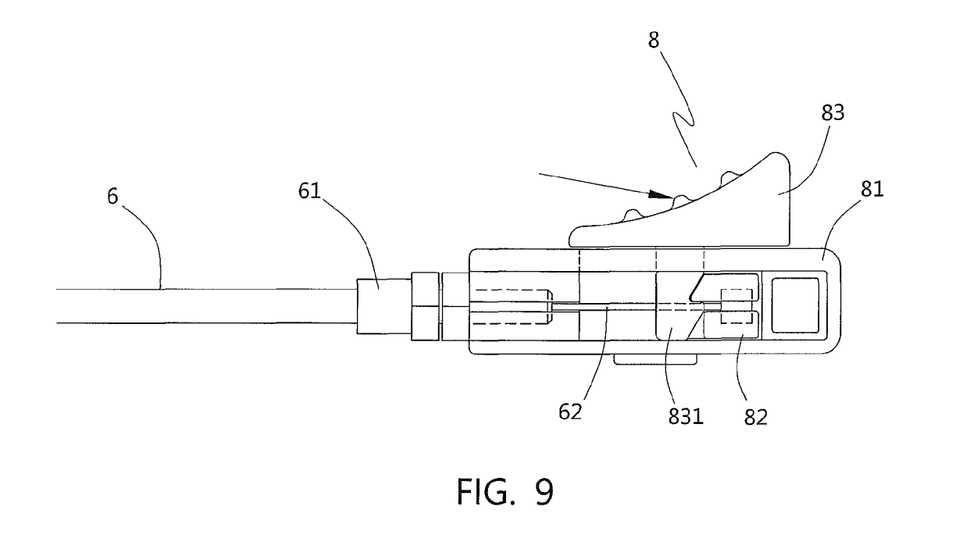
FIG. 9 is a schematic view of the control unit after operation according to the present invention.
Figure 10:
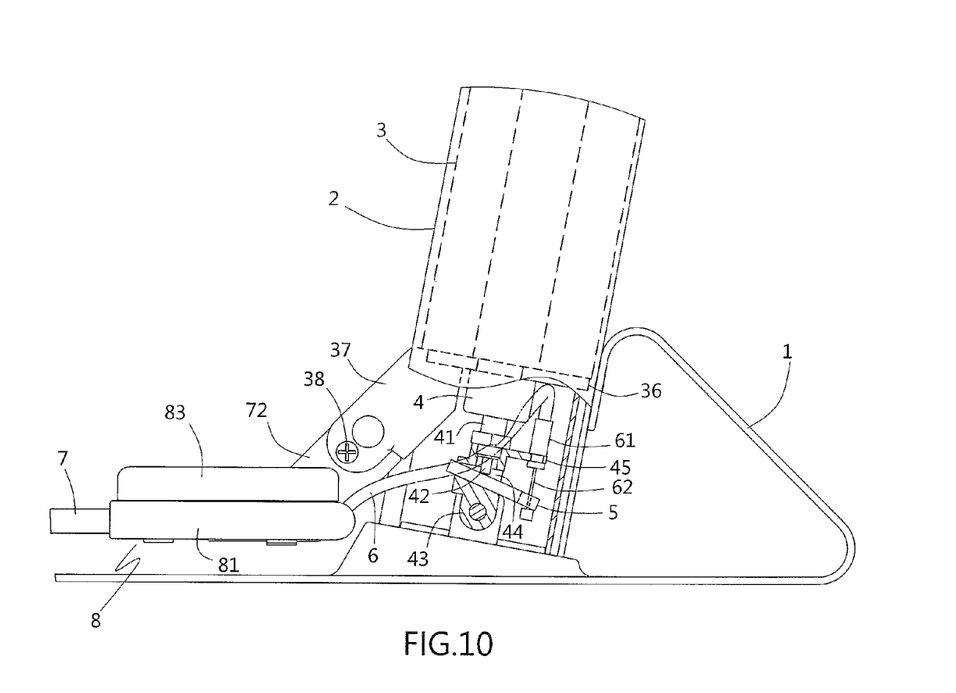
FIG. 10 is a schematic view of a gas-releasing pin of the pneumatic rod before the gas-releasing pin is pressed against according to the present invention.
Figure 11:
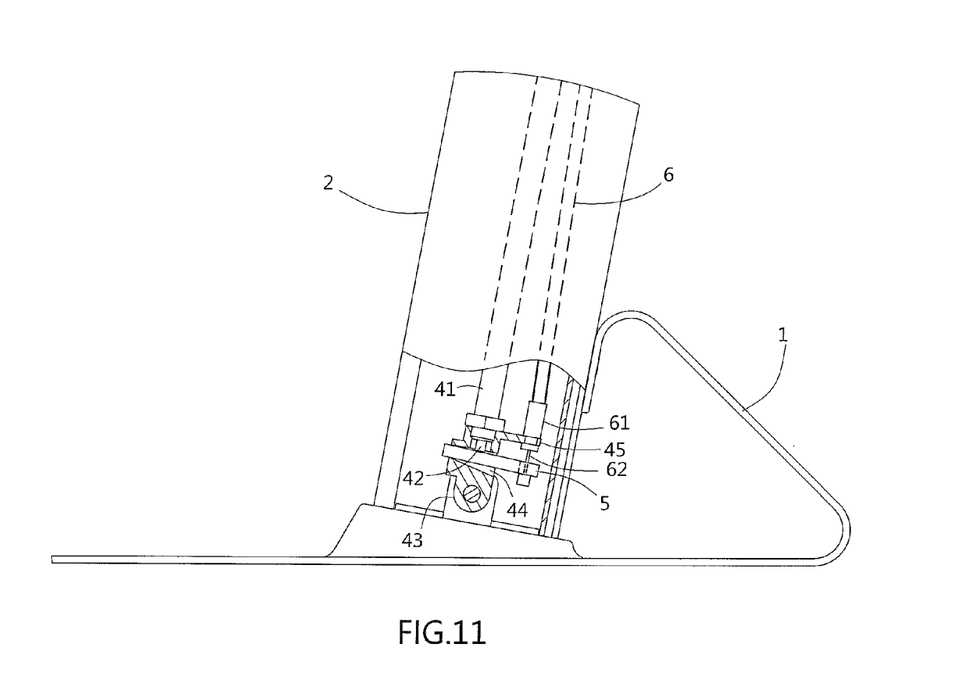
FIG. 11 is a schematic view of the gas-releasing pin of the pneumatic rod after the gas-releasing pin has been pressed against according to the present invention.

Referring to FIG. 7, a control unit 8 is mounted on a lateral side of the keyboard supporting plate 7. The control unit 8 comprises a holder 81 fastened to the keyboard supporting plate 7. A sliding block 82 is received in the holder 81, positioned proximate to the rear wall thereof, and adapted to slide therein. Hence, the other end of the sleeve portion 61 of the control cable 6 abuts against the outer side of the holder 81, and, then, the other end of the cord 62 gets engaged with the sliding block 82. A slit 810 is disposed on the holder 81 of the sliding block 82. The control unit 8 has a slide control key 83 for sliding on the holder 81. A pressing portion 831 is disposed at the bottom of the slide control key 83 and extends downward to pass through the slit 810 before pressing against the pressing portion 831 in the front of the sliding block 82. Referring to FIGS. 8, 9, the slide control key 83 can move back and forth along the slit 810 and thereby drive the sliding block 82 to slide within the holder 81. Hence, as shown in FIGS. 10, 11, the sliding block 82 pulls the cord 62 of the control cable 6, and in consequence the control stick 5 penetratingly disposed at the connector 43 swings up and down, thereby pressing on and releasing the gas-releasing pin 42 disposed at the pneumatic rod 4. Hence, referring to FIGS. 12, 13, the extensible rod 41 of the pneumatic rod 4 can extend and retract to therefore drive the vertical movement and positioning of the vertically-movable inner pipe 3.

Figure 12:
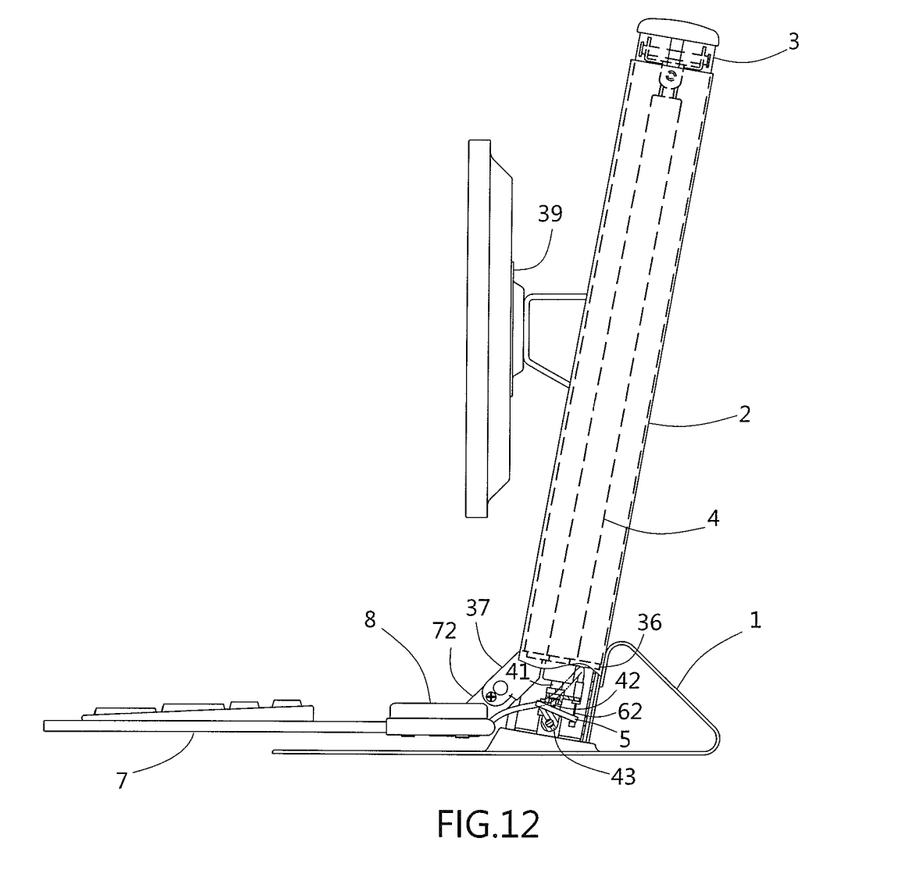
FIG. 12 is a schematic view of the monitor and keyboard before their ascent according to the present invention.
Figure 13:
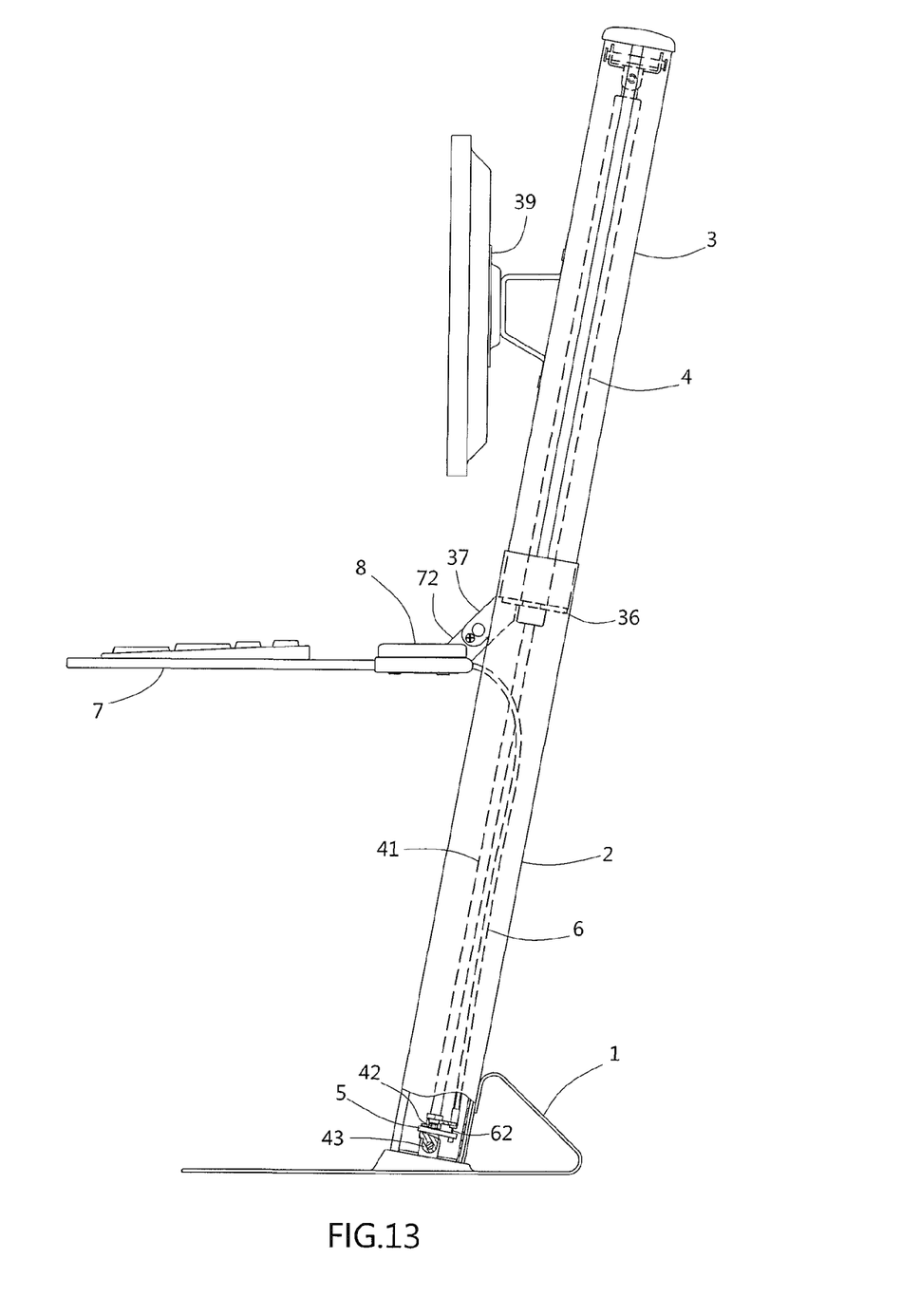
FIG. 13 is a schematic view of the monitor and keyboard after their ascent according to the present invention.

Referring to FIGS. 12, 13, the device of the present invention is put on the top of a conventional desk. A monitor is fixed to the monitor holder 39, of the vertically-movable inner pipe 3 of the device. A keyboard and/or mouse are/is placed on the keyboard supporting plate 7 of the device. When positioned at the lowest operating heights, the monitor and keyboard can be operated by a user sitting on a chair. To operate the monitor and keyboard while standing, the user holds the keyboard supporting plate 7 by hand, uses his/her fingers to push or release the slide control key 83 to allow the pneumatic rod 4 to extend and retract to drive the vertically-movable inner pipe 3 to undergo vertical movement, adjusts the operating heights of the monitor and keyboard such that the monitor and keyboard attain their optimal operating heights, and releases his/her grip on the slide control key 83 such that the slide control key 83 restores its initial position to stop the pneumatic rod 4 from extending and retracting. In consequence, the monitor and keyboard are positioned at the intended operating heights. Therefore, the device of the present invention is operated easily and effortlessly. Accordingly, users of difference body sizes are able to adjust the operating heights of the monitor and keyboard as needed and thus operate them easily.

Figure 14:
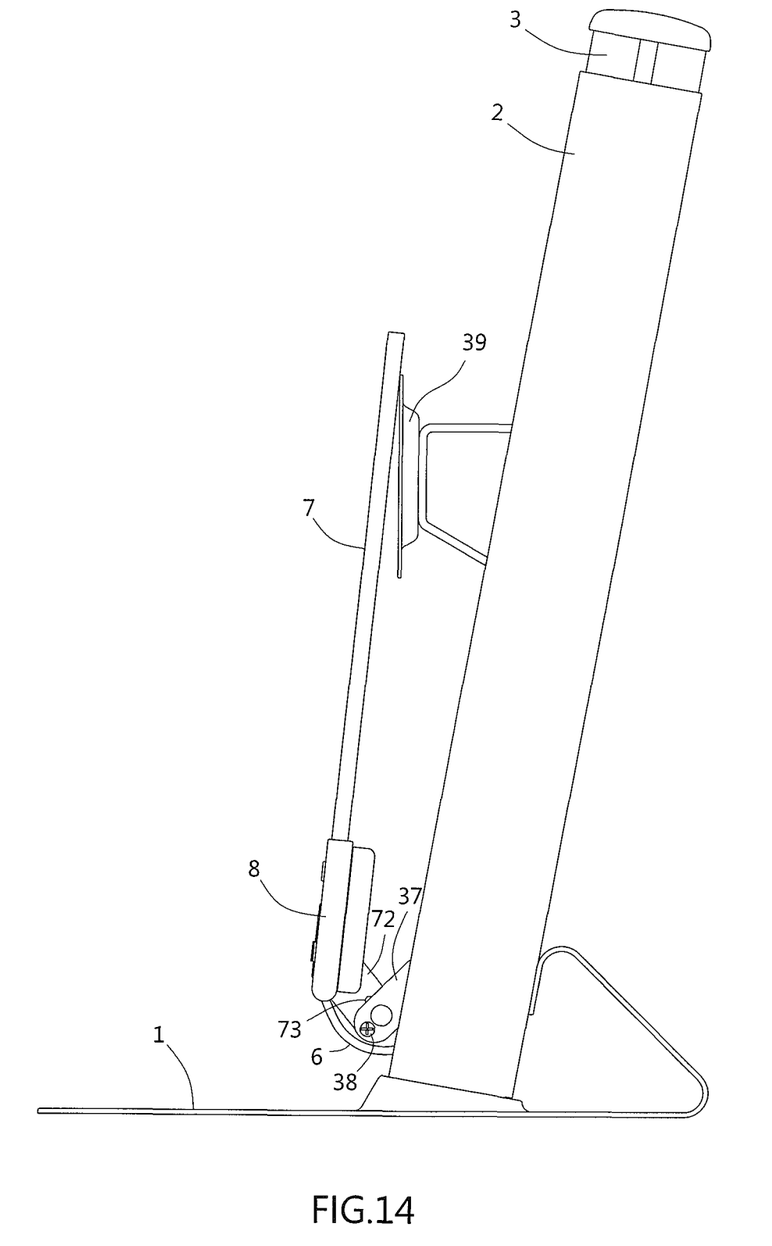
FIG. 14 is a schematic view of the keyboard supporting plate after it has been folded according to the present invention.

Referring to FIG. 3, after the positioning screw 38 has exited the positioning hole 73, the keyboard supporting plate 7 can be bent upward as shown in FIG. 14 to therefore lean against the monitor holder 39. Hence, the device of the present invention takes up the least possible space and thus is easy to store or reduce its packaged volume.

What is claimed is:

1. A desktop device for lifting and lowering a keyboard and monitor, with the desktop device comprising:
    a bottom base;
    a vertically-movable stand unit fixed to the bottom base and comprising a securing outer pipe and a vertically-movable inner pipe penetratingly fitted inside the securing outer pipe;
    a monitor holder and a keyboard supporting plate both being disposed at the vertically-movable inner pipe;
    a control unit mounted on a lateral side of the keyboard supporting plate to control vertical movement of the vertically-movable inner pipe, wherein the securing outer pipe is erected on and fixed to the bottom base, wherein the monitor holder and the keyboard supporting plate is mounted on the vertically-movable inner pipe from slightly above and below, respectively;
    a pneumatic rod with an extensible rod which has a terminal end;
    a gas-releasing pin disposed at the terminal end of the extensible rod, with the pneumatic rod received in the vertically-movable inner pipe, with an upper end of the pneumatic rod pivotally fixed to a vicinity of the upper end of the vertically-movable inner pipe, with the terminal end of the extensible rod connected with a connector pivotally fixed to the bottom base;
    an admitting hole radially, centrally disposed at the connector; and
    a control stick disposed in the admitting hole, with the control stick having a terminal end extending outward of the connector to abut against the gas-releasing pin disposed at the terminal end of the extensible rod, with an outer end of the control stick connecting with a control cable,
    wherein the control unit comprises a holder fixed to an edge of the keyboard supporting plate, and a slide control key slidably mounted on the holder, with the slide control key connected to another end of the control cable,
    wherein the slide control key is dragged and released to drive the control cable for pulling and releasing the control stick, and wherein the control stick swings up and down and thereby presses on and releases the gas-releasing pin of the pneumatic rod, to control the vertical movement and positioning of the vertically-movable inner pipe.

2. The device of claim 1, further comprising:
    a connecting base with a first pivotal fixing portion extending forward and fixed to the lower end of the vertically-movable inner pipe; and
    another connecting base with a second pivotal fixing portion extending backward and centrally fixed to a rear edge of the keyboard supporting plate, wherein the first and second pivotal fixing portions are pivotally fixed together, with a positioning screw penetratingly disposed on a lateral side of the first pivotal fixing portion of the connecting base disposed at the lower end of the vertically-movable inner pipe, and with a positioning hole disposed at the first pivotal fixing portion of the connecting base at the rear end of the keyboard supporting plate with the positioning screw penetrating the positioning hole.

3. The device of claim 1, wherein a front of the securing outer pipe has an opening whose two sides form two opposing inner grooves, respectively, with a protruding guide portion protrudingly disposed on a back of the securing outer pipe and opposite the opening, wherein a front of the vertically-movable inner pipe has an opening whose two sides form two guide slide portions slidingly disposed in the two inner grooves on the front of the securing outer pipe, respectively, with a substantially C-shaped opening slot disposed on the back of the vertically-movable inner pipe, and wherein two guide wheels are disposed on two inner sides of the opening slot to abut against two lateral sides of the protruding guide portion of the securing outer pipe, respectively.

* * * * *